US010317983B2

(12) United States Patent
Obie et al.

(10) Patent No.: US 10,317,983 B2
(45) Date of Patent: Jun. 11, 2019

(54) ACCESSORY DEVICE POWER MANAGEMENT

(71) Applicant: Microsoft Technology Licensing, LLC, Redmond, WA (US)

(72) Inventors: Gene Robert Obie, Clinton, WA (US); Yi He, Issaquah, WA (US); Duane Martin Evans, Snohomish, WA (US); Heng Huang, Sammamish, WA (US); Michael Earl Gruber, Carnation, WA (US); Thitipant Tantasirikorn, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/405,135

(22) Filed: Jan. 12, 2017

(65) Prior Publication Data

US 2017/0160790 A1    Jun. 8, 2017

Related U.S. Application Data

(63) Continuation of application No. 14/033,501, filed on Sep. 22, 2013, now Pat. No. 9,594,415.

(51) Int. Cl.
*G06F 1/26* (2006.01)
*G06F 1/3287* (2019.01)
(Continued)

(52) U.S. Cl.
CPC ............ *G06F 1/3287* (2013.01); *G06F 1/263* (2013.01); *G06F 1/266* (2013.01); *G06F 1/3296* (2013.01); *G06F 1/1632* (2013.01)

(58) Field of Classification Search
CPC ............................... G06F 1/3287; G06F 1/266
(Continued)

(56) References Cited

U.S. PATENT DOCUMENTS 5,860,015 A * 1/1999 Olson ....................... G06F 1/16
   713/300
5,963,015 A * 10/1999 Lee ........................... H02J 7/00
   320/128

(Continued)

FOREIGN PATENT DOCUMENTS

CN    201256186 Y    6/2009
JP    H1091292 A    4/1998
(Continued)

OTHER PUBLICATIONS

"Foreign Office Action", Application No. MX/a/2016/003723, dated Jun. 9, 2017, 3 pages.
(Continued)

*Primary Examiner* — Jaweed A Abbaszadeh
*Assistant Examiner* — Sumil M Desai
(74) *Attorney, Agent, or Firm* — Rainier Patents, PS

(57) ABSTRACT

Accessory device power management techniques are described in which a power exchange state for a system including a host computing device, an accessory device, and an adapter is recognized. Power exchange states may be defined according to relative states of charge (RSOC) and connection status for the system components and mapped to power management control actions. Responsive to the recognition of a current power exchange state, corresponding power management control actions may be ascertained and applied to jointly manage power for the system. For instance, the host device may draw supplemental power from a power source associated with an accessory device (e.g., a battery or power adapter) or supply power for use by the accessory device according to different states. Power exchanges may also be managed in accordance with capabilities of the accessory device identified based on authentication of the accessory device.

20 Claims, 10 Drawing Sheets

(51) Int. Cl.
*G06F 1/3296* (2019.01)
*G06F 1/16* (2006.01)

(58) Field of Classification Search
USPC .......................................................... 713/300
See application file for complete search history.

(56) References Cited

U.S. PATENT DOCUMENTS

| | | | |
|---|---|---|---|
| 6,127,809 A | 10/2000 | Kates et al. | |
| 6,204,637 B1 | 3/2001 | Rengan | |
| 6,653,813 B2 | 11/2003 | Khatri | |
| 6,820,206 B1* | 11/2004 | Kim et al. | G06F 1/26 713/300 |
| 7,403,232 B1 | 7/2008 | Orlicki et al. | |
| 8,000,820 B2 | 8/2011 | Griffin, Jr. | |
| 8,230,242 B2 | 7/2012 | Rathi et al. | |
| 9,594,415 B2 | 3/2017 | Obie et al. | |
| 2007/0046254 A1 | 3/2007 | Chen et al. | |
| 2007/0236408 A1 | 10/2007 | Yamaguchi et al. | |
| 2008/0167088 A1* | 7/2008 | Rabu et al. | H04M 1/00 710/100 |
| 2009/0179612 A1 | 7/2009 | Sherman et al. | |
| 2011/0016333 A1 | 1/2011 | Scott et al. | |
| 2011/0320828 A1 | 12/2011 | Boss et al. | |
| 2013/0103965 A1 | 4/2013 | Golembeski, Jr. | |
| 2013/0300343 A1* | 11/2013 | Files et al. | H02J 7/00 320/107 |
| 2013/0328399 A1 | 12/2013 | Suzuki et al. | |
| 2015/0089248 A1 | 3/2015 | Obie et al. | |

FOREIGN PATENT DOCUMENTS

| | | | |
|---|---|---|---|
| JP | 2000207240 A | 7/2000 | |
| JP | 2003029885 A | 1/2003 | |
| JP | 2007272341 A | 10/2007 | |
| JP | 2008242825 A | 10/2008 | |
| JP | 2013080523 A | 5/2013 | |
| JP | 2013254408 A | 12/2013 | |
| RU | 2449745 C2 | 5/2012 | |

OTHER PUBLICATIONS

"Final Office Action", U.S. Appl. No. 14/033,501, dated Aug. 12, 2016, 21 pages.
"International Preliminary Report on Patentability", Application No. PCT/US2014/056420, dated Nov. 25, 2015, 9 pages.
"International Search Report and Written Opinion", Application No. PCT/US2014/056420, dated Dec. 17, 2014, 10 pages.
"Non-Final Office Action", U.S. Appl. No. 14/033,501, dated Mar. 14, 2016, 19 pages.
"Non-Final Office Action", U.S. Appl. No. 14/033,501, dated Sep. 16, 2015, 16 pages.
"Notice of Allowance", U.S. Appl. No. 14/033,501, dated Oct. 28, 2016, 5 pages.
"Second Written Opinion", Application No. PCT/US2014/056420, dated Aug. 14, 2015, 8 Pages.
"First Office Action and Search Report Issued in Chinese Patent Application No. 201480052150.5", dated Dec. 27, 2017, 17 Pages.
"Office Action Issued in Japanese Patent Application No. 2016-543998", dated Feb. 8, 2018, 6 Pages.
"Search Report Issued in Japanese Patent Application No. 2016-543998", dated Jan. 26, 2018, 11 Pages.
"Second Office Action Issued in Chinese Patent Application No. 201480052150.5", dated Sep. 17, 2018, 13 Pages.
"Office Action Issued in Japanese Patent Application No. 2016-543998", dated Jul. 30, 2018, 6 Pages.
"Office Action Issued in Russian Patent Application No. 2016110075", dated Jul. 5, 2018, 6 Pages.
"Office Action Issued in European Patent Application No. 14783706.6", dated May 3, 2018, 9 Pages.

* cited by examiner

| System P-states | Description | Approx Pwr(w) |
|---|---|---|
| S0 | Full operating state (screen on or off) | 6-40 |
| S3 | Sleep (low power "standby" state, context saved in RAM, screen OFF, CPU/GPU off) | 0.65 |
| S4 | Shutdown (with context, context saved to disk) (same as S5 from EC psv) | 0.13 |
| S5 | Shutdown (no context saved) | 0.13 |
| DeepSlp (DS) | Deep Sleep state (GfX specific --> 5.4M in low power wake mode and RTC powered) | .002 |
| OFF | Unpowered (batteries) at 0V w/no PSU attached) | 0 |

| Battery Mode | Description | Internal Battery | External Battery (Accessory) |
|---|---|---|---|
| Charge (Chg) | Battery is configured for charging | | DchgM = Maximum Accessory load current<br>DchgP = Preferred Accessory load current<br>DchgD = Accessory Requested Discharge Current (Dynamic) |
| Discharge (Dchg/d) | Battery supplying full load power | | N/A |
| Standby | Available for Turbo assist or full load upon loss of primary power | N/A | Accessory attached in Off mode = no current on the 1 amp interface |
| Off | | | |
| Detach (Det) | DFET = Open (bat FG HW controlled) | | Accessory physically detached or physically attached w FW detach |

| Description | | Internal | External |
|---|---|---|---|
| | | RSOC >= 9x % | RSOC >= 9x % |
| Full | F | RSOC > 9x % | N/A |
| Partial | P | RSOC = 80% | N/A |
| Accessory Chg Thresh | J | RSOC = 5% | N/A |
| Critical | C | RSOC = 5% | RSOC = 0% |
| Throttling Threshold | T | RSOC = 5% | |
| Reserve | R | | |

Combined RSOC formula:
Combined RSOC = (Remaining_capacity_internal + Remaining_capacity_external) / (Full_capacity_internal + Full_capacity_external)

Fig. 10

# ACCESSORY DEVICE POWER MANAGEMENT

RELATED APPLICATION

This application is a continuation of and claims priority to U.S. patent application Ser. No. 14/033,501 filed Sep. 22, 2013 entitled "Accessory Device Power Management", the disclosure of which is incorporated by reference herein in its entirety.

BACKGROUND

Mobile computing devices have been developed to increase the functionality that is made available to users in a mobile setting. For example, a user may interact with a mobile phone, tablet computer, or other mobile computing device to check email, surf the web, compose texts, interact with applications, and so on. One challenge that faces developers of mobile computing devices is efficient power management and extension of battery life. For instance, a host device has limited availability of power from an internal battery. In some scenarios, a device may obtain supplemental power from an external battery. However, internal and external batteries associated with traditional devices are typically charged and managed separately. One consequence of this approach is that availability to use the host device apart from an external battery (or other power source) may be limited by the initial charge state of the internal battery. Additionally, a user may have to carry and use multiple different chargers to maintain internal and external batteries, which is cumbersome and inefficient.

SUMMARY

Accessory device power management techniques are described. In one or more implementations, a power exchange state for a system including a host computing device, an accessory device, and an adapter is recognized. A plurality of power exchange states may be defined and mapped to power management control actions. In one approach, the power exchange states are defined according to relative states of charge (RSOC) for the accessory and host as well as connection status of the accessory and adapter to the system. Responsive to the recognition of a current power exchange state, corresponding power management control actions may be ascertained and applied to jointly manage power for the system. In dependence upon the ascertained power exchange state, the host device may draw supplemental power from a power source associated with an accessory device (e.g., a battery or power adapter) or supply power for use by the accessory device. Additionally, power exchange between a host device and an accessory device may be managed in accordance with capabilities of the accessory device that are identified based on authentication of the accessory device. In an implementation, a power controller is configured to enable three-way power flow and power exchange between power supplies/batteries corresponding to the host, an accessory connected via an accessory interface of the host, and an adapter accessory connected via an adapter interface of the host.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 8 depicts a portion of an example power state management table in accordance with one or more implementations.

FIG. 9 depicts another portion of an example power state management table in accordance with one or more implementations.

FIG. 10 depicts a key showing conventions employed for the example power state management table of FIGS. 8 and 9.

DETAILED DESCRIPTION

Overview

Internal and external batteries associated with traditional devices are typically charged and managed separately. This approach may limit overall availability to use the host device apart from an external battery and may cause a user to carry and use multiple different chargers to maintain internal and external batteries, which is cumbersome and inefficient.

Accessory device power management techniques are described. In one or more implementations, a power exchange state for a system including a host computing device, an accessory device, and a power adapter is recognized. A plurality of power exchange states may be defined and mapped to power management control actions. In one approach, the power exchange states are defined according to relative states of charge (RSOC) for the accessory and host, as well as connection status of the accessory and adapter to the system. In addition or alternatively, power exchange states may also be defined in terms of other charge measures, metrics, and/or parameters such as power consumption rates, power state of the device or OS, thermal operating conditions, and so forth. Responsive to the recognition of a current power exchange state, corresponding power management control actions may be ascertained and applied to jointly manage power for the system components. In dependence upon the ascertained power exchange state, the host device may draw supplemental power from a power source associated with an accessory device (e.g., a battery or power adapter) or supply power for use by the accessory device. This enables the host to drain power from the accessory to charge the internal battery and/or handle system load. Further, an external battery associated with the accessory device may be charged through the host in some scenarios. Additionally, power exchange between a host device and an accessory device may be managed in accordance with capabilities of the accessory device that are identified based on authentication of the accessory device. In an implementation, a power controller is configured to enable three-way power flow and power exchange between power supplies/batteries corresponding to the host, an accessory connected via an accessory interface of the host, and/or an adapter accessory connected via an adapter interface of the host.

In the following discussion, an example environment and devices are first described that may employ the techniques described herein. Example details and procedures are then described which may be performed in the example environment and by the devices as well as in other environments and by other devices. Consequently, implementation of the example details and procedures is not limited to the example environment/devices and the example environment/devices are not limited to the example details and procedures.

Example Operating Environment

Figure 1:
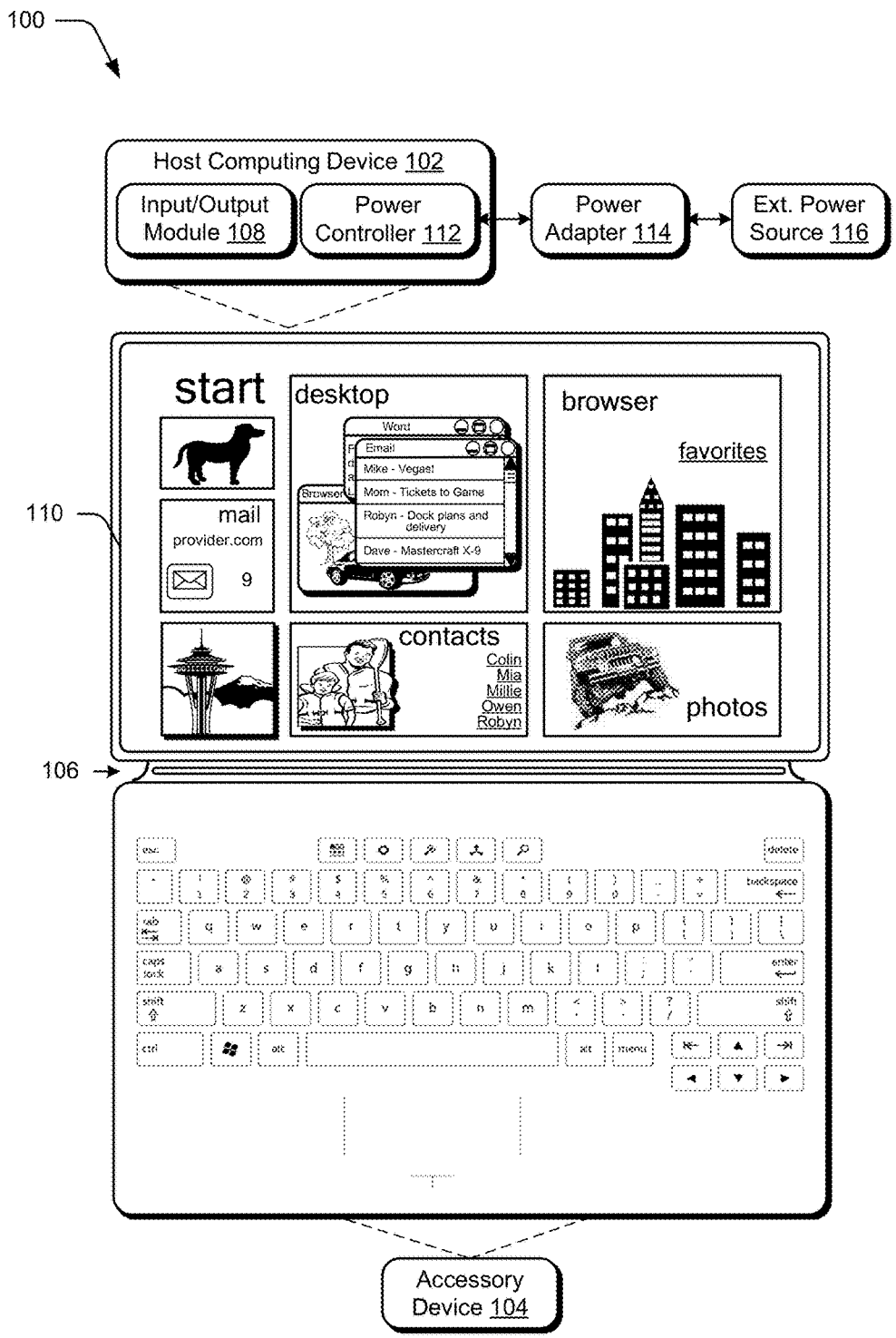
FIG. 1 is an illustration of an environment in an example implementation that is operable to employ the techniques described herein.

FIG. 1 is an illustration of an environment 100 in an example implementation that is operable to employ the techniques described herein. The illustrated environment 100 includes an example of a host computing device 102 that is physically and communicatively coupled to an accessory device 104 via a flexible hinge 106. The host computing device 102 may be configured in a variety of ways. For example, the computing device 102 may be configured for mobile use, such as a mobile phone, a tablet computer as illustrated, and so on. Thus, the host computing device 102 may range from full resource devices with substantial memory and processor resources to a low-resource device with limited memory and/or processing resources. The host computing device 102 may also relate to software that causes the host computing device 102 to perform one or more operations.

The host computing device 102, for instance, is illustrated as including an input/output module 108. The input/output module 108 is representative of functionality relating to processing of inputs and rendering outputs of the host computing device 102. A variety of different inputs may be processed by the input/output module 108, such as inputs relating to functions that correspond to keys of the input device, keys of a virtual keyboard displayed by the display device 110 to identify gestures and cause operations to be performed that correspond to the gestures that may be recognized through the accessory device 104 and/or touchscreen functionality of the display device 110, and so forth. Thus, the input/output module 108 may support a variety of different input techniques by recognizing and leveraging a division between types of inputs including key presses, gestures, and so on.

In the illustrated example, the accessory device 104 is a device configured as a keyboard having a QWERTY arrangement of keys although other arrangements of keys are also contemplated. Further, other non-conventional configurations for an accessory device 104 are also contemplated, such as a game controller, configuration to mimic a musical instrument, a power adapter, and so forth. Thus, the accessory device 104 may assume a variety of different configurations to support a variety of different functionality. Different accessory devices may be removably connected to the computing device at different times.

As previously described, the accessory device 104 is physically and communicatively coupled to the host computing device 102 in this example through use of a flexible hinge 106. The flexible hinge 106 represents one illustrative example of an interface that is suitable to connect and/or attach and accessory device to a host computing device 102. The flexible hinge 106 is flexible in that rotational movement supported by the hinge is achieved through flexing (e.g., bending) of the material forming the hinge as opposed to mechanical rotation as supported by a pin, although that embodiment is also contemplated. Further, this flexible rotation may be configured to support movement in one direction (e.g., vertically in the figure) yet restrict movement in other directions, such as lateral movement of the accessory device 104 in relation to the host computing device 102. This may be used to support consistent alignment of the accessory device 104 in relation to the computing device 102, such as to align sensors used to change power states, application states, and so on.

The flexible hinge 106, for instance, may be formed using one or more layers of fabric and include conductors formed as flexible traces to communicatively couple the accessory device 104 to the host computing device 102 and vice versa. This communication, for instance, may be used to communicate a result of a key press to the computing device 102, receive power from the computing device, perform authentication, provide supplemental power to the host computing device 102, and so on. Authentication may be performed according to the methods described in U.S. patent application Ser. No. 13/471,405, filed May 14, 2012, entitled "Accessory Device Authentication," the entire disclosure of which is incorporated by reference in its entirety. The flexible hinge 106 or other interface may be configured in a variety of ways to support multiple different accessory devices 104, further discussion of which may be found in relation to the following figure.

As further illustrated in FIG. 1 the computing device 102 may include a power controller 112 configured to implement aspects of accessory device power management techniques described herein. In particular, the power controller 112 represents functionality to perform various operations for power management. This may include management of different power sources and switching between the sources, implementing a defined and/or selected power management scheme, managing battery life, and so forth. The power controller 112 may also facilitate connections and communications with a power adapter 114 (also referred to herein as a power supply unit (PSU)) configured to supply power to the device via a suitable external power source 116, such as a wall socket, external battery, power supply unit, or other of power source. The power controller 112 may also be operable to supply power to accessory devices in appropriate circumstances. In other words, the power controller 112 may manage power operations jointly for a host computing device and authorized accessory devices including power exchange between the host computing device and an accessory device.

The power controller 112 may be implemented in hardware, software, firmware and/or combinations thereof. By way of example and not limitation, the computing device 102 may include a microcontroller or other suitable hardware logic device configured to implement various functionally that is described herein in relation to power controller 112. The power controller 112 may therefore represent firmware or logic associated with a suitable hardware logic device. In addition or alternatively, the power controller 112 may be implemented by way of a processing system of the device and one or more program modules that are executable/operable via the processing system.

The power adapter 114 may be configured to selectively operate in multiple modes and supply multiple power levels to the computing device. The level of power supplied at a particular time may be based upon input, notifications, or other suitable feedback configured and sent to the power adapter 114 by the power controller 112 to cause the power adapter 114 to supply a corresponding level of power. Depending upon a power exchange state, the power adapter 114, when connected to the computing device, may charge a battery associated with one or both of the host and accessory, supply power to support operations of one or both the host and accessory, and otherwise supply power from external power sources 116 for joint charging and operation of the host and accessory in various combinations. A power scheme implemented via the power controller 112 may be configured to control flow of power between system components (e.g., host, accessory, and adapter) in dependence upon a power exchange state. Further details regarding operation of the power controller 112 and the power adapter 114 to implement accessory device power management can be found in the following discussion.

Figure 2:
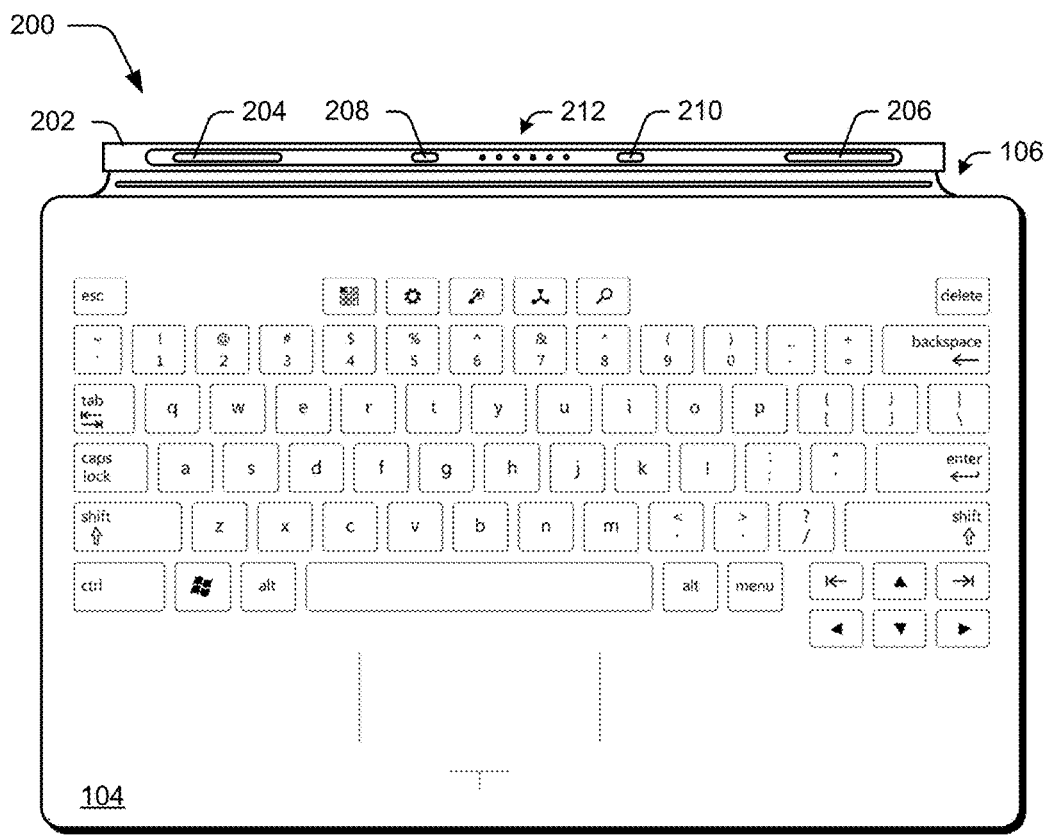
FIG. 2 depicts an example implementation of an accessory device of FIG. 1 showing an interface in greater detail.

FIG. 2 depicts an example implementation 200 of the accessory device 104 of FIG. 1 as showing the flexible hinge 106 (e.g., interface) in greater detail. In this example, a connection portion 202 of the input device is shown that is configured to provide a communicative and physical connection between the accessory device 104 and the host computing device 102. In this example, the connection portion 202 has a height and cross section configured to be received in a channel in the housing of the computing device 102, although this arrangement may also be reversed without departing from the spirit and scope thereof. The connection portion 202 provides an interface through which attachment/connection of the accessory device 104 to the computing device may be detected. In at least some embodiments, this interface enables communications for authentication and control of the accessory device 104 as described herein. For example, the computing device 102 may receive credentials and other data regarding capabilities of the accessory device through the interface responsive to detecting the presence/attachment of the accessory device 104. The interface may also provide a power coupling for exchange of power.

The connection portion 202 is flexibly connected to a portion of the accessory device 104 that includes the keys through use of the flexible hinge 106. Thus, when the connection portion 202 is physically connected to the computing device the combination of the connection portion 202 and the flexible hinge 106 supports movement of the accessory device 104 in relation to the computing device 102 that is similar to a hinge of a book.

For example, in at least some implementations, rotational movement may be supported by the flexible hinge 106 such that the accessory device 104 may be placed against the display device 110 of the host computing device 102 and thereby act as a cover. The accessory device 104 may also be rotated so as to be disposed against a back of the computing device, e.g., against a rear housing of the computing device that is disposed opposite the display device 110 on the computing device.

Naturally, a variety of other orientations are also supported. For instance, the host computing device 102 and an accessory device 104 may assume an arrangement such that both are laid flat against a surface as shown in FIG. 1. In another instance, a typing arrangement may be supported in which the accessory device is laid flat against a surface and the computing device is disposed at an angle to permit viewing of the display device 110, e.g., such as through use of a kickstand disposed on a rear surface of the computing device. Other instances are also contemplated, such as a tripod arrangement, meeting arrangement, presentation arrangement, and so forth.

The connecting portion 202 is illustrated in this example as including magnetic coupling devices 204, 206, mechanical coupling protrusions 208, 210, and a plurality of communication contacts 212. The magnetic coupling devices 204, 206 are configured to magnetically couple to complementary magnetic coupling devices of the computing device 102 through use of one or more magnets. In this way, the accessory device 104 may be physically secured to the computing device through use of magnetic attraction.

The connecting portion 202 also includes mechanical coupling protrusions 208, 210 to form a mechanical physical connection between the accessory device 104 and the computing device 102. The mechanical coupling protrusions 208, 210 are shown in greater detail in the following figure.

Figure 3:
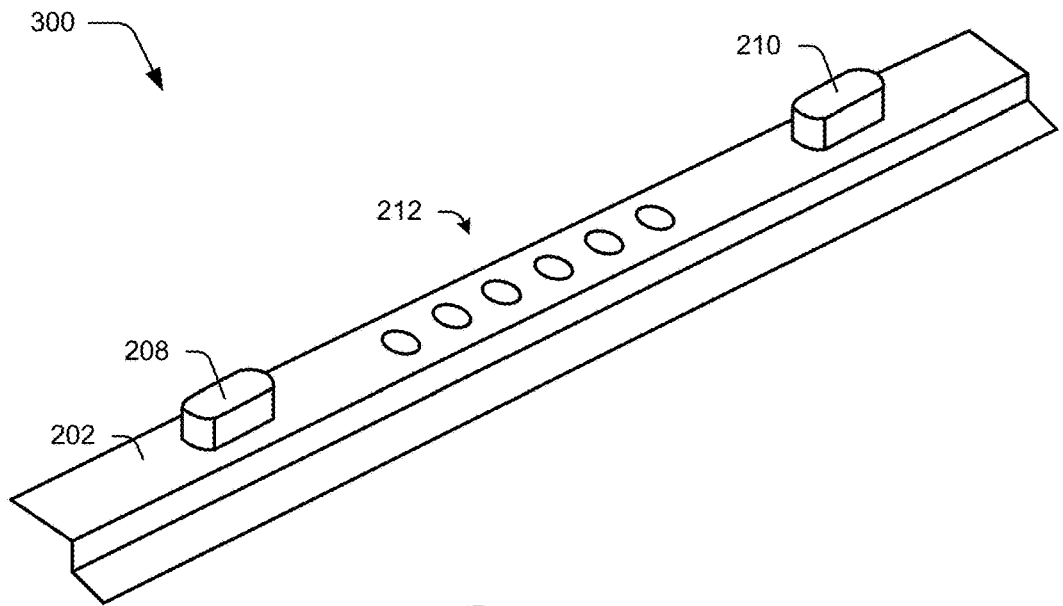
FIG. 3 depicts an example implementation showing a perspective view of a connecting portion of FIG. 2 that includes mechanical coupling protrusions and a plurality of communication contacts.

FIG. 3 depicts an example implementation 300 shown a perspective view of the connecting portion 202 of FIG. 2 that includes the mechanical coupling protrusions 208, 210 and the plurality of communication contacts 212. As illustrated, the mechanical coupling protrusions 208, 210 are configured to extend away from a surface of the connecting portion 202, which in this case is perpendicular although other angles are also contemplated. Mechanical coupling protrusions 208, 210 that are configured in this manner may be referred to as "fangs" due to the way in which they extend away from a surface of the connecting portion 202.

The mechanical coupling protrusions 208, 210 are configured to be received within complimentary cavities within the channel of the host computing device 102. When so received, the mechanical coupling protrusions 208, 210 promote a mechanical binding between the devices when forces are applied that are not aligned with an axis that is defined as correspond to the height of the protrusions and the depth of the cavity. In at least some embodiments, the mechanical coupling protrusions 208, 210 may also be configured to form a power coupling through which power exchanges described herein may occur.

For example, when a force is applied that does coincide with the longitudinal axis described previously that follows the height of the protrusions and the depth of the cavities, a user overcomes the force applied by the magnets solely to separate the accessory device 104 from the computing device. However, at other angles the mechanical coupling protrusion 208, 210 are configured to mechanically bind within the cavities, thereby creating a force to resist removal of the accessory device 104 from the computing device 102 in addition to the magnetic force of the magnetic coupling devices 204, 206. In this way, the mechanical coupling protrusions 208, 210 may bias the removal of the accessory device 104 from the computing device to mimic tearing a page from a book and restrict other attempts to separate the devices.

The connecting portion 202 is also illustrated as including a plurality of communication contacts 212. The plurality of communication contacts 212 is configured to contact corresponding communication contacts of the computing device to form a communicative coupling between the devices. As mentioned, the communicative coupling may be used to convey credentials and/or other information that may be employed by the computing device to identify/authenticate an accessory device 104. The communication contacts 212 may be configured in a variety of ways, such as through formation using a plurality of spring loaded pins that are configured to provide a consistent communication contact between the accessory device 104 and the computing device 102. Therefore, the communication contacts may be configured to remain during minor movement or jostling of the devices. A variety of other examples are also contemplated, including placement of the pins on the host computing device 102 and contacts on the accessory device 104, incorporating at least some communication contacts 212 with the mechanical coupling protrusions 208, 210 and/or complimentary cavities, and so forth. Moreover, in addition or alternatively to forming a power coupling through mechanical coupling protrusions 208, 210 (e.g., fangs) as mentioned above, at least some of the communication contacts 212 may be configured to create a power coupling suitable for power exchange.

Example Accessory Device Power Management Details

Figure 4:
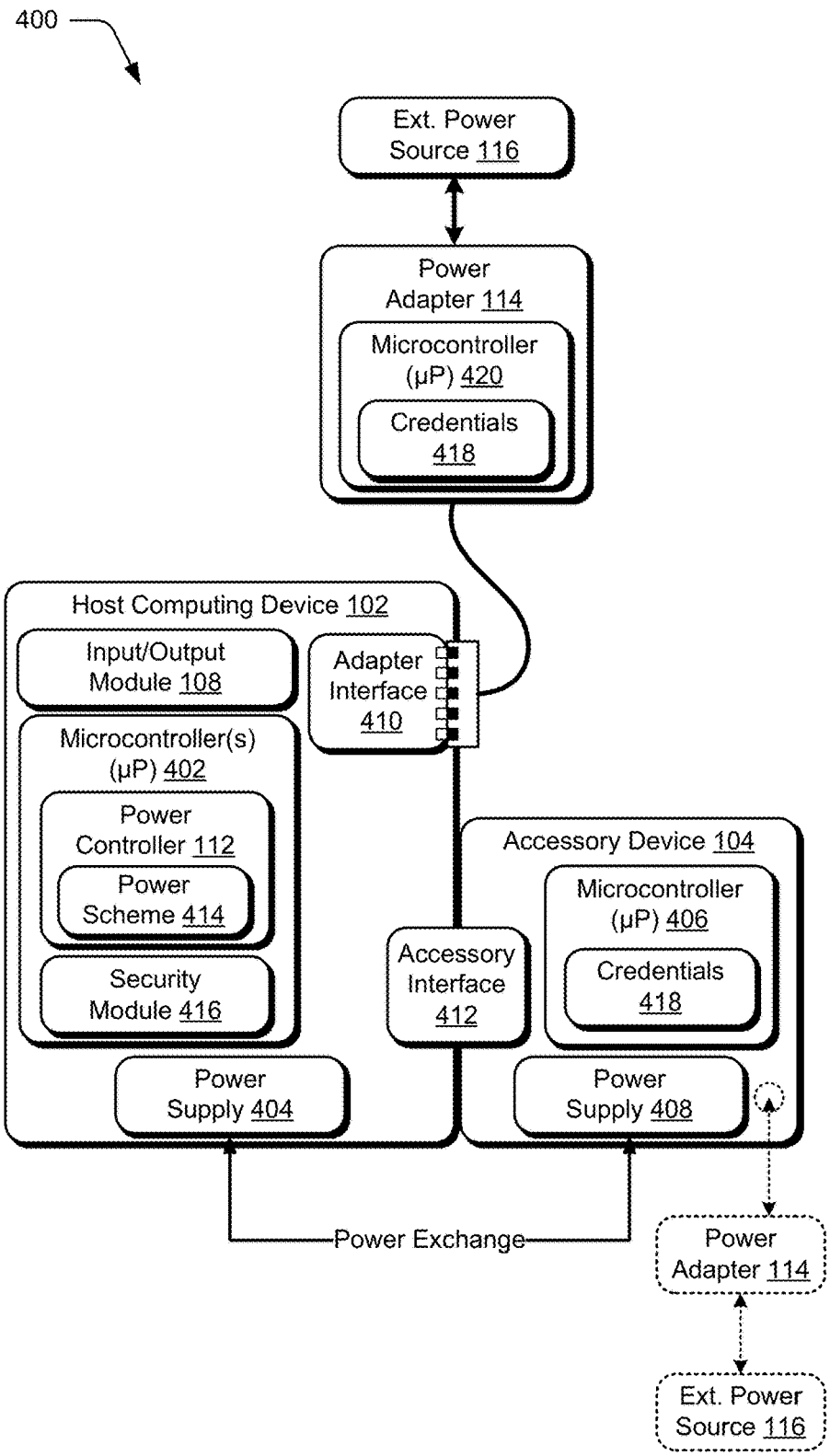
FIG. 4 depicts an example computing device and accessory device of FIG. 1 in greater detail.

FIG. 4 depicts generally at 400 an example host computing device 102 and accessory device 104 in greater detail. In FIG. 4, the host computing device 102 is depicted as having a power controller 112 is illustrated as being provided by one or more microcontroller(s) 402, also referred to as microprocessing unit(s) (μP)). The computing device 104 further includes an associated power source 404, such as one or more internal batteries. The accessory device 104 may also include one or more microcontroller(s) 406 and a respective power supply 408. The power supply 408 may be configured as one or more batteries that are internal to the accessory device 104 (e.g., an accessory battery) and may therefore be considered external batteries with respect to the host computing device 102.

The example microcontrollers (μPs) represent hardware devices/systems that are designed to perform a predefined set of designated tasks. Microcontrollers may represent respective on-chip systems/circuits having self-contained resources such as processing components, I/O devices/peripherals, various types of memory (ROM, RAM, Flash, EEPROM), programmable logic, and so forth. Different microcontrollers may be configured to implement embedded applications/functionality that are implemented at least partially in hardware and perform corresponding tasks. In particular, the example microcontrollers 402, 406 enable performance of tasks for device authentication and power management outside of operation of a general purpose processing system and other applications/components of the computing device or accessory device. Generally, power consumption of the microcontrollers is low in comparison with operating a general purpose processing system for a device.

Accordingly, components implemented via microcontrollers may operate using relatively low power, independently of operating a "primary" processing system of a host computing device, and/or without booting/executing an operating system or using other device components and applications. In other words, the microcontrollers may operate to perform some power management tasks in a low power mode without having to operate or supply power to the processing system and other device components (e.g., device memory, network interface, display device, etc.) and/or without completely starting-up or waking-up the computing device.

The host computing device 102 may be connectable to a power adapter 114 via an adapter interface 410. For example, a connector associated with the power adapter 114 may connect to the adapter interface 410 to enable exchange of control signals, data, and power. The host computing device 102 is connectable to the accessory device 104 via an accessory interface 412, such as the flexible hinge 106 discussed in relation to FIGS. 2 and 3, or another suitable interface. As represented in FIG. 4, power exchange may occur between the power supply 404 of the host and the power supply 408 of the accessory in accordance with techniques described above and below. In some implementations, the external power source 116 may be configured as an external battery that is included with or connected to the power adapter 114. Additionally, an adapter accessory device (other than a power adapter) may be connected via the adapter interface 410 in some scenarios. Thus, power exchange may also occur between the host and an external battery connected via the adapter interface 410. Moreover, three-way power exchange may occur between batteries corresponding to the host, an accessory connected via the accessory interface, and an adapter/accessory connected via the adapter interface. Generally, power exchange between the host and one or more connected devices (adapters/accessories) may occur back and forth (e.g., bi-directionally) from the host to one or more of the devices, from one or more of the devices to the host, and/or directly between connected devices (e.g. device to device) through the host.

Thus, power exchange may occur via the accessory interface 412 in some scenarios, as well as via the adapter interface 410. Power supplied to the host computing device 102 from the power adapter 114 via the adapter interface 410 may be used to operate the host (e.g., service the system load) and/or to maintain a charge level of the power supply 404 (e.g., internal battery). Additionally, power supplied to the host from the power adapter 114 may be supplied directly or indirectly to the accessory device 104 to support operations and/or charge the power supply 408 (e.g., external battery). Moreover, power may be distributed from the host computing device 102 and/or the accessory device 104 to an accessory connected via the adapter interface 410 in some implementations. It should be noted that the host computing device 102 and accessory device 104 may both be configured to employ external power sources 116, such as through the use of respective power adapters 114 connected to a wall socket or another source. Power supplied directly to the accessory device 104 via a respective power adapter 114 may be used, shared, and/or exchanged between the host and accessory in a manner comparable to power that is supplied directly to the host computing device 102 via the adapter interface 410.

The host computing device may be configured to implement a power scheme 414 and a security module 416 in various ways. In the illustrated example, the power scheme 414 is depicted as being implemented via the power controller 112. In this example, the power scheme 414 is configured as firmware associated with the host computing device 102. For example, the power scheme 414 may represent firmware associated with a microcontroller 402, power controller 112, or other suitable hardware logic device. Alternatively, the power scheme 414 may be implemented as a standalone module using any suitable combination of hardware, software, firmware, and/or logic devices.

The power scheme 414 represents functionality to implement accessory device power management techniques described above and below. In particular, the power scheme 414 may be configured to jointly manage power flow between the power adapter 114, host computing device 102, and accessory device 104. By way of example and not limitation, this may include controlling power flow to selectively charge batteries associated with the components (e.g., power supply 404 and power supply); exchange power between the batteries, processing systems, and components; supply power to service the system load for the host and accessory; and so forth.

In an implementation, the power scheme 414 includes or makes use of data describing a plurality of power exchange states defined for the system. A power exchange state may indicate current load requirements, charge states, and/or connection status for system components. In one approach, the power exchange states are defined based upon relative state of charge (RSOC) for the host and accessory as well as connection status for the accessory and a power adapter (external power source). The power exchange states may also each be mapped to corresponding power control actions that are initiated according to the power scheme 414 in response to detection of a current power exchange state. In operation, the current power exchange state for the system is detected and then power control actions corresponding to the detected power exchange state are applied by the power scheme 414 to manage power.

The security module 416 represents functionality operable to identify and/or authenticate accessory devices when the devices are attached/connected to the computing devices. The security module 416 may be configured to implement a variety of different authentication techniques. Generally speaking, the security module 416 performs an authentication sequence in which credentials 418 (e.g., device ID/password, alphanumeric code, an identifying resistor value, etc.) associated with an accessory device 104 are obtained and verified. The accessory device 104 in FIG. 4 is illustrated as including example credentials 418, which may be provided to the security module 416 for authentication upon request. If the credentials are valid (e.g., the device is a recognized device that has associated privileges), the authentication is considered successful and the accessory device 104 may be authorized for power exchange through the power controller 112 and other interaction with the host computing device 102. On the other hand, if the credentials are not valid, interaction of the accessory device 104 with the computing device 102 may be restricted in various ways and/or prevented. Thus, the security module 416 may prevent unauthorized devices from supplying/using power in ways that may be inefficient and/or unsafe.

Note, that the power adapter 114 may also have respective credentials 418 that may be used to identify and/or authenticate the power adapter when attached/connected. This may enable the host computing device 102 to understand the capabilities for different power adapters, such as the size of the power adapter, power supply levels, capability to vary power or operate in different modes, type of adapter, and so forth. The power scheme 414 may be configured to include and apply power control actions that are different for different power adapters having different capabilities. Likewise, power control actions may vary for different accessory devices that may be connected to the host device at different times.

Further, the power adapter 114 may be configured as a combination device that acts as a power adapter for the host as well as an adapter accessory that provides additional functionality. For example, the power adapter 114 may provide a universal serial bus (USB) port to connect an external device to a power supply and/or to the host. In addition or alternatively, some accessories may be connected to the host via the adapter interface 410. For example, a docking station, media player, touch pad, or other adapter accessory may be connectable to the host computing device via the adapter interface 410. These adapter accessory devices may include powered and/or unpowered devices. The powered adapter accessory devices may include a battery and/or connection to a power source that may be used to supply power to the host. Unpowered adapter accessory devices may be powered by the host via the adapter interface 410 using techniques described herein. Power exchange states and actions to control power flow to and from adapter accessory devices connected via the adapter interface 410 may depend upon identification/authentication of the adapter accessory devices as well as capabilities of the devices in the manner discussed above.

Accordingly, the power scheme 414 may be configured to perform power management in dependence upon particular adapters and accessories. The power management, power exchange states, and power management control actions additionally depend upon connection status of the adapters and accessories (e.g., whether or not an adapter or accessory is connected to the host). The power scheme 414 may operate to support dynamic adjustment of charge and discharge rates for various batteries available in different configurations of the host, accessory, and adapter (or other accessory). The power scheme 414 may further operate to support dynamic adjustment of power consumption rates for accessories/devices attached via the accessory interface 414 and/or the adapter interface 410.

In an implementation, the particular adapters and accessories connected to the host at different times may be configured to manage their own charge/consumption, and discharge/supply rates relative to operating conditions, thermal properties, battery cycle life, power supply ratings/maximums, and so forth. This may include determining by the connected adapters/accessories appropriate levels for power supply or power draw and communicating with the host to request corresponding allocation or reallocation of power flow. The host may react to such requests in accordance with the power scheme to allocate power and configure hardware (e.g., switches and controllers) to perform corresponding power management control actions. Additional details regarding accessory device power management techniques are discussed in relation to the example system of FIG. 5.

Figure 5:
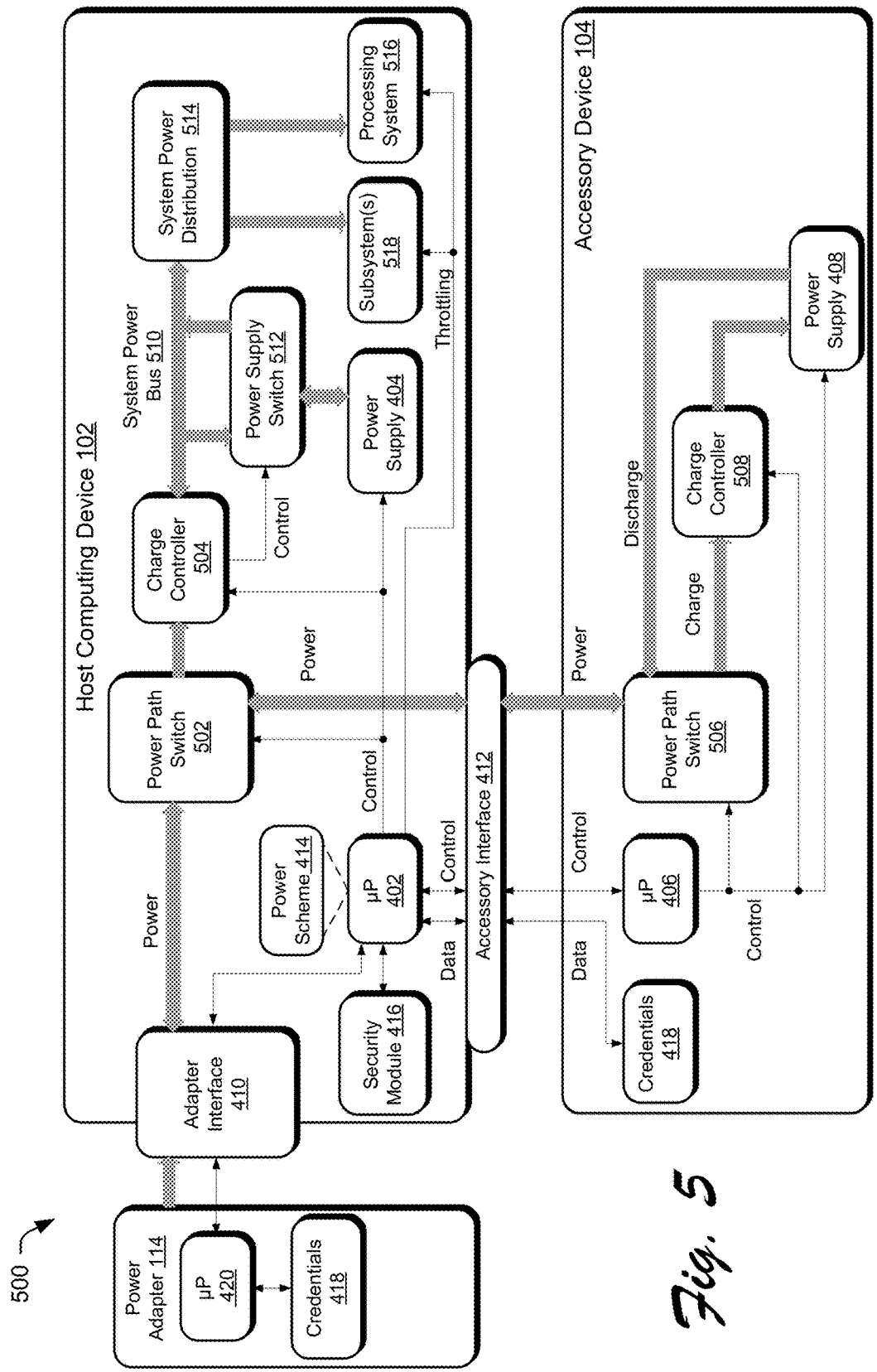
FIG. 5 depicts an example representation of power and control flow for a system in accordance with one or more implementations.

In particular, FIG. 5 illustrates generally at 500 an example power and control flow diagram for a representative system. The system includes a host computing device 102, accessory device 104, and a power adapter 114 as described previously. The host computing device 102 may be configured to implement a power scheme 414 as described above and below to jointly manage power flow between the system components. In this example, the power scheme 414 is implemented as firmware associated with microcontroller 402, although other implementations are also contemplated.

In the depicted example, the host computing device 102 includes a power path switch 502 that represents functionality operable in accordance with the power scheme 414 to direct power flow through the system and a charge controller 504 operable to control the power supply 404 of the host. The power path switch 502 may be configured to supply power to and receive power from the accessory device 104 via an accessory interface 412. In particular, the power path switch 502 may operate to distribute power to and from a corresponding power path switch 506 of the accessory device 104. The accessory device 104 may also include a respective charge controller 504 operable to control the power supply 408 of the accessory.

On the host side, the power path switch 502 may obtain power from the power adapter 114 when connected. The power path switch is configured to distribute the power between the host and accessory in accordance with the power scheme 414 corresponding control signals communicated to direct operation of various components as depicted in FIG. 5. Power may be supplied through the power path switch 502 to a system power bus 510. Under direction of the charge controller 502, the system power bus 510 may direct power through a power supply switch 512 to charge the power supply 404 (e.g., an internal battery). The power supply 404 may also supply power through the power supply switch 512 to the system power bus 510 to service the system load and/or to power the accessory device 104 in some scenarios. As further depicted, the system power bus 510 may be connected to a system power distribution 514 component. The system power distribution 514 component represents functionality to distribute power to the processing system 516, subsystem(s) 518, and/or other components of the host computing device 510.

On the accessory side, the power path switch 506 may obtain power from the host or supply power to the host via the accessory interface 412 when connected. Power may be directed to and from the power supply in accordance with the power scheme 414 and corresponding control signals. For example, the charge controller 508 may operate as directed by the power scheme 414 to charge or discharge the power supply 408 (e.g., external battery) in dependence upon a power exchange state detected for the system. As described above and below the power exchange state may depend upon the load requirements, charge states, and/or connection status. Thus, different power control actions to jointly manage power for the accessory and host may be taken based on the current power exchange states, as described in greater detail in relation to the following example procedures.

Having considered the preceding discussion of an example operating environment, system, and devices, consider now a discussion of example procedures which includes further implementation details regarding the example techniques for accessory device power management.

Example Procedures

The following discussion describes accessory device power management techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference may be made to the example operating environment 100 of FIG. 1 and the example devices of FIGS. 2-5, respectively.

Figure 6:
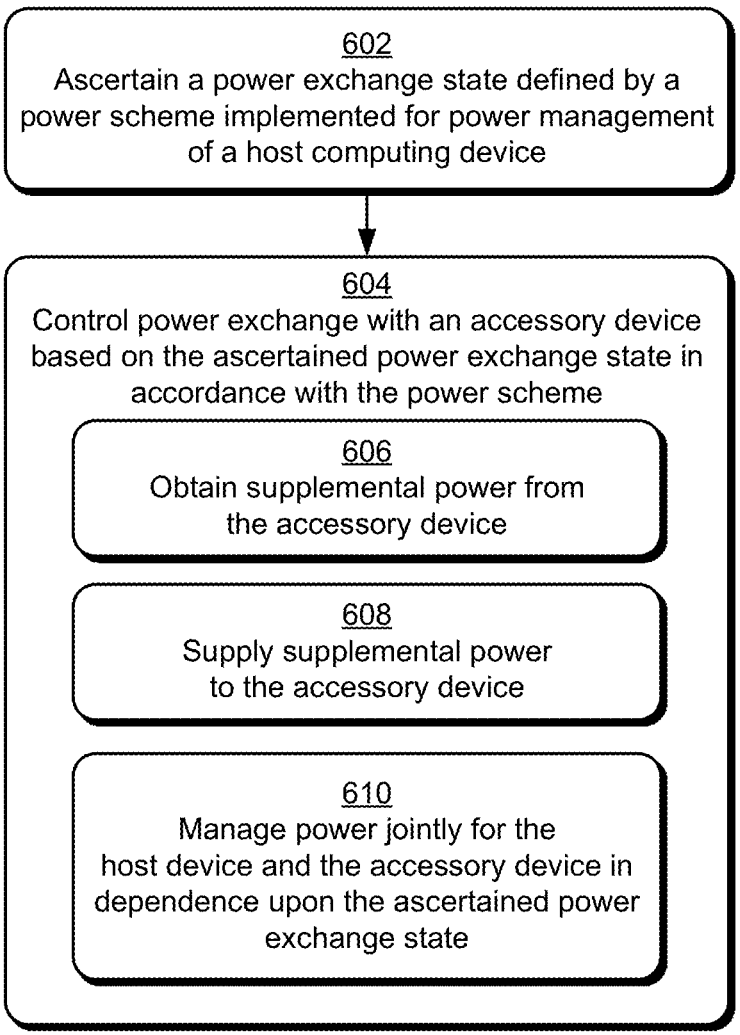
FIG. 6 depicts an example procedure in accordance with one or more implementations.

FIG. 6 depicts an example procedure 600 in which power exchange with an accessory device is controlled based upon an ascertained power exchange state. In at least some embodiments, the procedure may be performed by a suitably configured computing device, such as the example computing device of FIG. 4 or 5 that include or otherwise make use of one or more microcontrollers 402 to implement a power scheme 414.

A power exchange state defined by a power scheme implemented for power management of a host computing device is ascertained (block 602). For example, different power exchange states may defined by a power scheme 414 host computing device 102. In order to determine a current power exchange state, the power scheme 414 may operate via a microcontroller 402 or otherwise to analyze configuration of the host computing device 102 and connected components. This may involve determining whether or not a power adapter 114 or accessory device 104 is connected. Additionally, credentials associated with an accessory device 104 and/or power adapter 114 may be employed to identify these components, perform authentication of the components for power exchange and other interaction, and/or discover capabilities of the components. In addition to determining a connection state for adapters/accessories, the configuration may be analyzed to determine load requirements and battery charge state for the host and accessory.

Power exchange states may therefore correspond to different combinations of connection status, load requirements, and/or battery charge state for the host, accessory, and adapter, as well as other criteria. For example, one power exchange state may be defined for a configuration in which a power adapter and accessory are attached to the host and charge level is at or above 80% for both an internal battery of the host and an external battery of the accessory. A different power exchange state may be associated with a configuration in which an accessory is attached to the host and the charge level is at or above 80% for both an internal battery of the host and an external battery of the accessory, but the adapter is not connected to the host. Yet another power exchange state may correspond to a configuration in which an accessory is attached to the host, the accessory has a charge level at or above 80% and the host has a charge level below 50%. Naturally, the enumerated states above are provided as illustrative examples and various other power exchange states may also be defined. Different states may also be defined based upon different combinations of connection status, load requirements, and/or battery charge states. In addition or alternatively, different combinations that define different states may be further based upon one or more of accessory device identities (e.g., authentication status of connected devices), operating conditions, device/operating system (OS) power states, charge level thresholds, load thresholds, a combined amount of available power, and/or adapter and/or accessory characteristics and capabilities, to name a few examples of additional criteria for power exchange states.

Power exchange with the accessory device is controlled based on the ascertained power exchange state in accordance with the power scheme (block 604). Power management performed in accordance with the power scheme may include configuring the host computing device to obtain supplemental power from the accessory device (block 606) and/or configuring the host device to supply supplemental power to the authorized accessory device (block 608).

Further, power management performed in accordance with the power scheme may include managing power jointly for the host device and the accessory device in dependence upon the ascertained power exchange state (block 610).

For example, the power controller 112 and/or power scheme 414 may determine power states for the accessory device and host device and manage exchange of power between the devices accordingly. Based on a determination that supplemental power for the host device is available from the accessory, power may be exchanged from the accessory to the host. In one approach, the power scheme 414 may operate to automatically discharge power from the accessory to supply power to maintain the charge of the internal battery and/or service the system load. In this manner, the charge level of the internal battery may be maintained so that the host computing device is in a ready state for use whenever a user detaches the accessory. In other words, the power scheme 414 may be configured to preferentially maintain the charge level of the internal battery at a designated threshold level over maintaining the charge of the external battery in some circumstances. However, based on a determination that the accessory lacks sufficient power to operate, the power controller 112 may optionally cause power to be exchanged from the host computing device to the accessory.

The power scheme 414 and hardware of the host is configured to support dynamically adjustable rates of charge and discharge for internal and external batteries to optimize the system. Discharge of an accessory battery may be controlled by the host. In at least some implementation, a microprocessor or controller of the accessory may be configured to communicate with the host to indicate operating conditions and capabilities and to request that the host draw power to discharge the battery. This approach enables the accessory to optimize the discharge based upon thermal conditions, battery life cycle, and or other considerations.

In connection with determining a current power exchange state for the system, the power controller 112 of a computing device (e.g., a microcontroller 402) may detect attach events and initiate appropriate actions to authenticate the accessory device 104 and/or power adapter 114 in response to the detection. This may involve invoking security module 416 to perform the authentication. If the host device is in a drained battery state, a limited amount of power may first be supplied to the host device by the accessory to enable the authentication. The limited amount of power may be sufficient to boot and operate the power controller 112, security module 416, and/or corresponding microcontrollers 402. The power controller 112 may then look for attached devices and initiate authentication if appropriate. In at least some embodiments, the security module 416 may operate under the direction of the power controller 112 to request or otherwise obtain credentials 418 from the accessory device 104 via a suitable communication channel. The security module may then verify the credentials to ensure that the accessory device 104 is an authorized device. The security module 416 may provide a notification with the authentication result or otherwise expose a result of authentication to the power controller for subsequent power management decisions. The power controller 112 and/or security module 416 may also identify capabilities of the accessory, power adapter, or adapter accessory such as identifying the type of device (e.g., keyboard, game controller, mouse, musical device, adapter, etc.), whether the accessory has a battery, the charge state of an accessory battery, power supply capabilities/ranges for an adapter or battery, and so forth. The power controller 112 may employ the identified capabilities to make power management decisions and implement appropriate power management control actions.

Various authentication techniques and credentials may be employed. By way of example and not limitation, authentication may be based upon a username and password, a unique device identifier such as a media access control (MAC) address, an alphanumeric code, an encrypted secret, a resistor value, or other suitable credentials. The security module 416 may be configured to decode/check the credentials using a security algorithm. The security module 416 may also compare the credentials to a list/database of known credentials for authorized devices. Authentication is successful when the security module 416 matches the credentials to known credentials for authorized devices. If credentials do not match, then the authentication is unsuccessful. In this case, exchange of power may be prevented or restricted to specified levels as discussed previously.

In accordance with the foregoing, a host computing device 102 may include a power controller 112 configured to implement a power scheme 414 for the device. In general, the power controller 112 is responsible for selective switching between multiple available power sources as well as charging of internal and accessory batteries. Available power sources may include power from an internal battery, a power supply adapter connected to an external source, and/or a battery of an authorized accessory device. The power controller 112 may include or make use of a security module 416 to authenticate accessory devices 104 and authorize power exchange with the accessory devices 104. The power controller 112 may further operate to restrict power exchange with unauthorized devices. Once an accessory device is authenticated/authorized, though, the power controller 112 may manage power for the accessory device jointly with the host computing device 102 in accordance with a power scheme. Some example details and characteristics of a power scheme that may be implemented by the power controller 112 are now described.

The power scheme 414 is configured to cause dynamic switching between available power sources (including power from authorized accessories) to maintain uninterruptible power to the load. The power scheme 414 may also manage the power flow to service the load and charge batteries of the host and accessory when sufficient power is available. When available power is relatively low, the power scheme 414 may operate to divert power to the host side, discharge the accessory battery, and/or throttle operations to maintain the host charge level above defined thresholds and/or critical levels. In the event of a failure of either the external power adapter or internal battery power, the system may automatically shift to an alternate available power source without user intervention. In order to manage power flow, the power scheme 414 and/or power controller may be configured to control operation of various switches, such as the power path switch 502, power path switch 506, and power supply switch 512. The power scheme 414 may also be configured to direct charge controllers that are associated with each battery/power source to manage charging and discharging. For instance, the power scheme 414 may direct the charge controller 504 associated with the power supply 404 of the host and the charge controller 508 associated with the power supply 408 of the accessory in the arrangement of FIG. 5.

The power scheme 414 may also operate to prevent power exchange with any accessory device unless the accessory device has passed authentication as described above. Authentication is typically completed in response to attachment of the accessory to the host. Re-authentication may also be configured to occur when the accessory device wakes up from a sleep or hibernate state. Authentication may also be lost when an accessory is detached and accordingly, the authentication for the accessory may be repeated upon reattachment to the host computing device.

The power controller 112 may be further configured to switch to an external power source supplied by a power adapter if available. For instance, the power controller 112 may detect presence of the power adapter and shift the operating power source from battery power to the power adapter in response to the detection. This enables charging of batteries when excess power is available from the external supply. Charging of both an internal battery and an accessory battery of an authorized accessory may be supported. Further, both an internal and accessory batteries may be charged simultaneously if sufficient power is available. If the system is currently being powered from the power adapter, the system may terminate battery charging and shift back to operation on battery power when the power adapter is disconnected or power from the adapter is otherwise interrupted.

The accessory battery associated with an authorized accessory is an optional power source for the operation of the host computing device 102 and as a power source for the accessory device 104 itself. The accessory battery may supplement the internal battery when power is not available via a power adapter/external source. In one approach, the power controller 112 is configured to selectively cause switching between the internal battery and an accessory battery based upon charge level of the batteries. In this approach, the system may be arranged to employ the batteries one at a time. In addition or alternatively, the system may be configured to employ power supplied simultaneously by the internal and external accessory battery in some scenarios.

The power controller 112 may be further configured to control the way in which multiple available batteries (e.g., internal and external) are charged and discharged according to the power scheme 414. Discharging and charging may be managed in various ways based at least in part upon the charge levels of the available batteries. By way of example and not limitation, the power scheme may be designed to generally prioritize maintaining the charge level of the internal battery over accessory batteries.

In this approach, the system uses power from accessory batteries before discharging the main internal battery. The discharge of batteries may occur sequentially in a number of power management stages that correspond to designated charge capacity levels or percentages. For example, an accessory battery may first be discharged to a level defined as "critical," such as five or ten percent remaining charge. Then, the system may switch to using the main internal battery and discharge it to the critical level. The load may again be shifted back to the accessory battery when both batteries are at the critical level. The accessory battery may be further discharged to a "discontinue" level (e.g., two percent remaining charge) defined as point at which the system discontinues use of the battery. The power controller 112 may then cause a switch back to the main internal battery, which is similarly discharged to the discontinue level. When both batteries have reached the discontinue level, the host computing device 102 may transition to a shutdown state. In order to maximize battery life, the power controller 112 may also operate to throttle various systems to reduce system load and prevent a system crash in the event of battery depletion to critical levels.

For charging, multiple batteries available to the host (internal and external) may be charged simultaneous if there is sufficient power to do so. If available power is not sufficient to support simultaneous charging, the power controller 112 may implement sequential charging with priority again being given to charging of the main internal battery. Similar to the discharge techniques just described, charging of multiple batteries may also occur in multiple stages that correspond to selected charge levels or percentages. For example, the main internal battery may be charged first to a designated "pre-charge" level, such as seventy or eighty percent. Then charging switches to an accessory battery, which is also charged to the designated pre-charge level. After this, the main internal battery is first topped-off to complete the charge to a "full charge" level and then the accessory battery is also topped-off to complete the charge to the full charge level. Naturally, the described stages, levels, and selected percentages for discharging and charging are provided as examples. Various alternative implementations may employ different numbers of stages and/or different selected charge percentages for the stages in a comparable manner.

Figure 7:
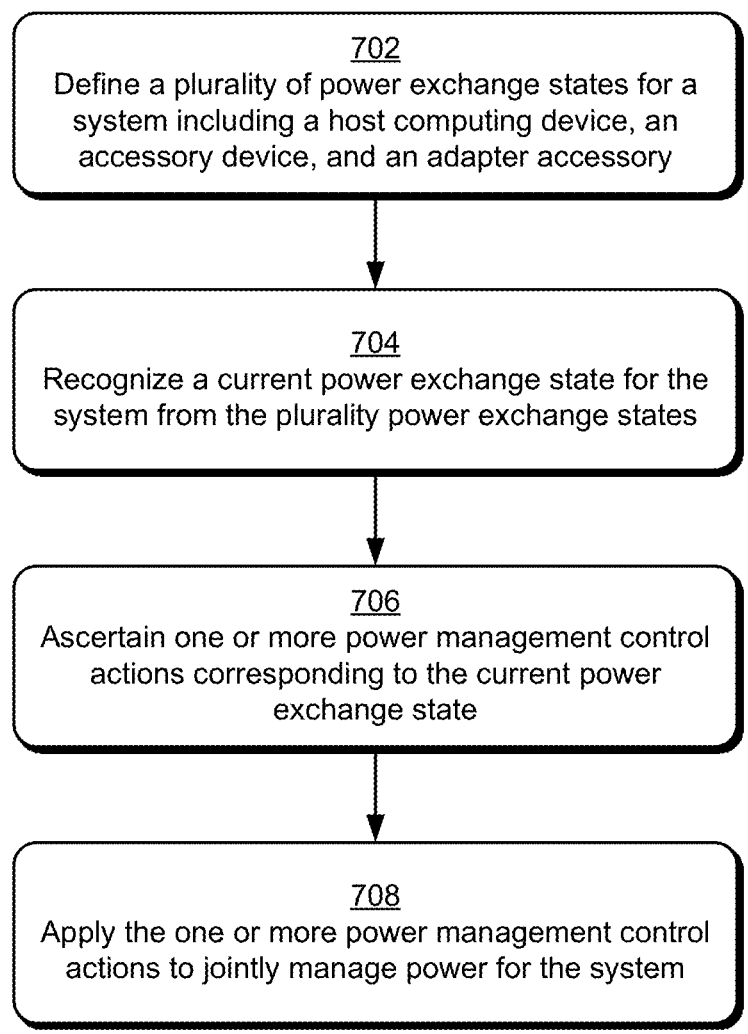
FIG. 7 depicts another example procedure in accordance with one or more implementations.

FIG. 7 depicts an example procedure 700 in which power management control actions are applied to jointly manage power for a system. In at least some embodiments, the procedure may be performed by a suitably configured computing device, such as the example computing device of FIG. 4 or 5 that include or otherwise make use of one or more microcontrollers 402 and/or a power controller 112 to implement a power scheme 414.

A plurality of power exchange states are defined for a system including a host computing device, an accessory device, and an adapter accessory (702). For example, power exchange states may be defined and incorporated with a power scheme as just described. The power exchange states may be associated with corresponding power management control actions that may be applied to control power flow, power distribution, battery charging/discharging, power allocation between components and so forth. In one approach, a database, document, or other suitable data structure may be configured as a power management state table. In general, the power management state table includes data sufficient to define the power exchange states and map the exchange state to corresponding power management control actions.

A current power exchange state for the system is recognized from the plurality power exchange states (block 704). For example, the power scheme 414 may operate to determine loads, connection status, charge levels (e.g., relative states of charge (RSOC)) and other configuration and operating condition criteria indicative of a power exchange state as discussed above and below. The configuration and operating condition criteria may be compared to power exchange state definitions to identify a matching state. In one approach, the comparison involves referencing a power management state table (or other comparable data) as described above or below to look-up a current power exchange state based upon detected configuration and operating condition criteria.

Then, one or more power management control actions corresponding to the current power exchange state are ascertained (block 706) and the one or more power management control actions are applied to jointly manage power for the system (block 708). Again, a power management state table (or other comparable data) may be referenced to look-up power management control actions that are mapped to the current power exchange state that is determined.

Power management control actions include but are not limited to controlling power flow to selectively charge batteries associated with the components; exchanging and distributing power between the batteries, processing systems, and components; supplying and allocating power to service the system load for the host and accessory; and so forth. Further details and examples regarding a power management state table and control actions are discussed in relation to FIGS. 8-13 below.

Power Scheme Details

This section describes some additional details regarding suitable power schemes that may be employed for accessory device power management. This includes a discussion of power exchange states and example power management state tables that may be employed in one or more implementations of the described techniques.

In general, the techniques described herein may enable a host to utilize external power sources with power capabilities that are smaller than the full system load requirements. This is in part because the power scheme 414 is configured to intelligently manage the power jointly with the accessory device and available power sources. The use of multiple power sources enables design of power adapters/PSUs that have capacity less than capacity to support maximum system load. As such, the power adapters/PSUs may be designed to be smaller, easier to carry, and/or lower in cost.

The host may be configured to use external batteries having various capacity, size, and configurations. Such external batteries may be incorporated as components of various different accessories that also may be designed to have different sizes and configurations. For example, a particular host may be configured to utilize power source that provide power in the range of 17 W to 42 W. A variety of other ranges are also contemplated.

Based on power exchange states, loading of power sources connected via either or both of an adapter interface 410 and an accessory interface 412 may by dynamically adjusted as requested by the components attached to those interface. An external battery of an accessory or associated with an adapter is capable of charging the internal battery. Further, the system can route power directly between an adapter interface 410 and an accessory interface 412 to service loads and charge corresponding batteries. Dedicated charge controllers may be associated with batteries for the host and accessories, such as charge controller 504, 508 illustrated in FIG. 5. The charge controllers may be directed in accordance with the power scheme 414 to facilitate charging both internal and external batteries of the system simultaneously via a power adapter 114 to rapidly charge the batteries. Additionally, the charge controller associated with an accessory may operate to charge the accessory when detached from the host via an associated power adapter 114 for the accessory.

The power scheme 414 is representative of various algorithms designed to utilize available external power for the purpose of servicing system loads while at the same time maintaining the charge level of the internal battery at designated levels. Thus, the power scheme 414 (implemented as firmware or otherwise) may configure controllers and/or other hardware to automatically adjust power flow through the system for load handling and battery charging. The power scheme 414 may prioritize charging of the internal battery of the host device whenever excess power is available. Additionally, the power scheme 414 may be configured to initiate throttling of a processing system, particular subsystems, and/or other selected components when available power reaches critically low levels (as defined by the power scheme).

As mentioned, power management implemented via power scheme 414 may depend upon a plurality of power exchange states. Allocation of power and power flow is determined based upon recognition of a power exchange state and corresponding power management control actions. The power exchange states may be defined according to criteria related to configuration of the system and operating conditions including but not limited to availability of external power sources, presence of accessory/external battery, state of charge for internal and external batteries, power load and consumption, thermal operating conditions, and/or device or OS power states. The power scheme 414 may include or make use of a power management state table to define the power exchange states and map the state to corresponding control actions. In at least some embodiments, the power exchange states correlate to relative states of charge (RSOC) for the host and one or more connected accessories. The power exchange states may also be based on other criteria as discussed herein.

Relative states of charge (RSOC) may be defined as a ratio of a remaining capacity of a battery/device to the full capacity of battery/device. RSOC may also be expressed as a percentage of full capacity. Similarly, combined RSOC for multiple devices may be computed as a ratio of the sum of remaining capacities to the sum of the full capacities for the multiple devices and/or corresponding batteries. Power state and corresponding actions may depend upon the RSOC for individual devices as well as the combined RSOC. The power scheme 414 may be configured in some implementations to maximize the relative state of charge for the internal battery of the host using available power sources while still servicing the system power requirements/load.

Figure 8:
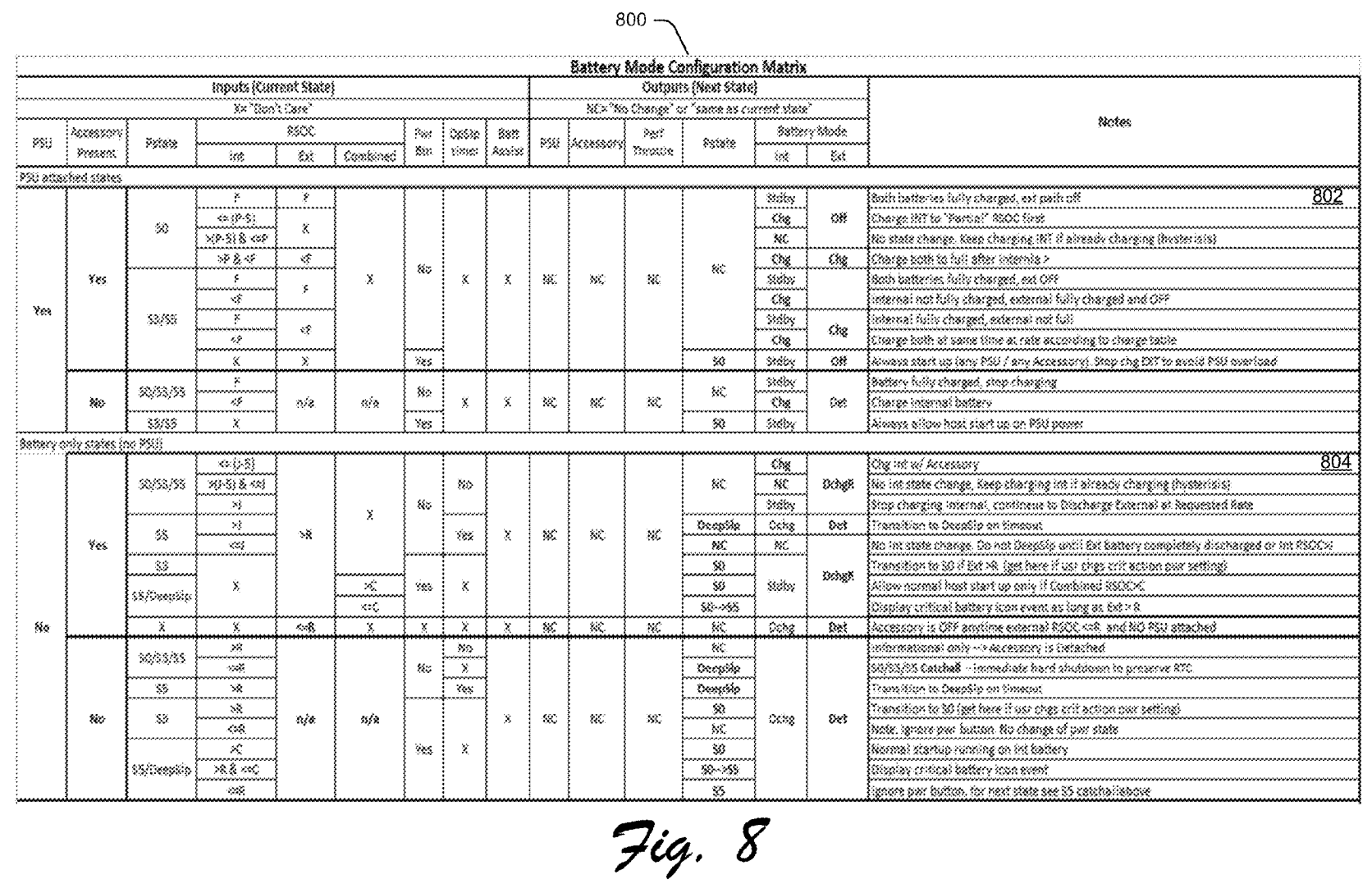
Figure 9:
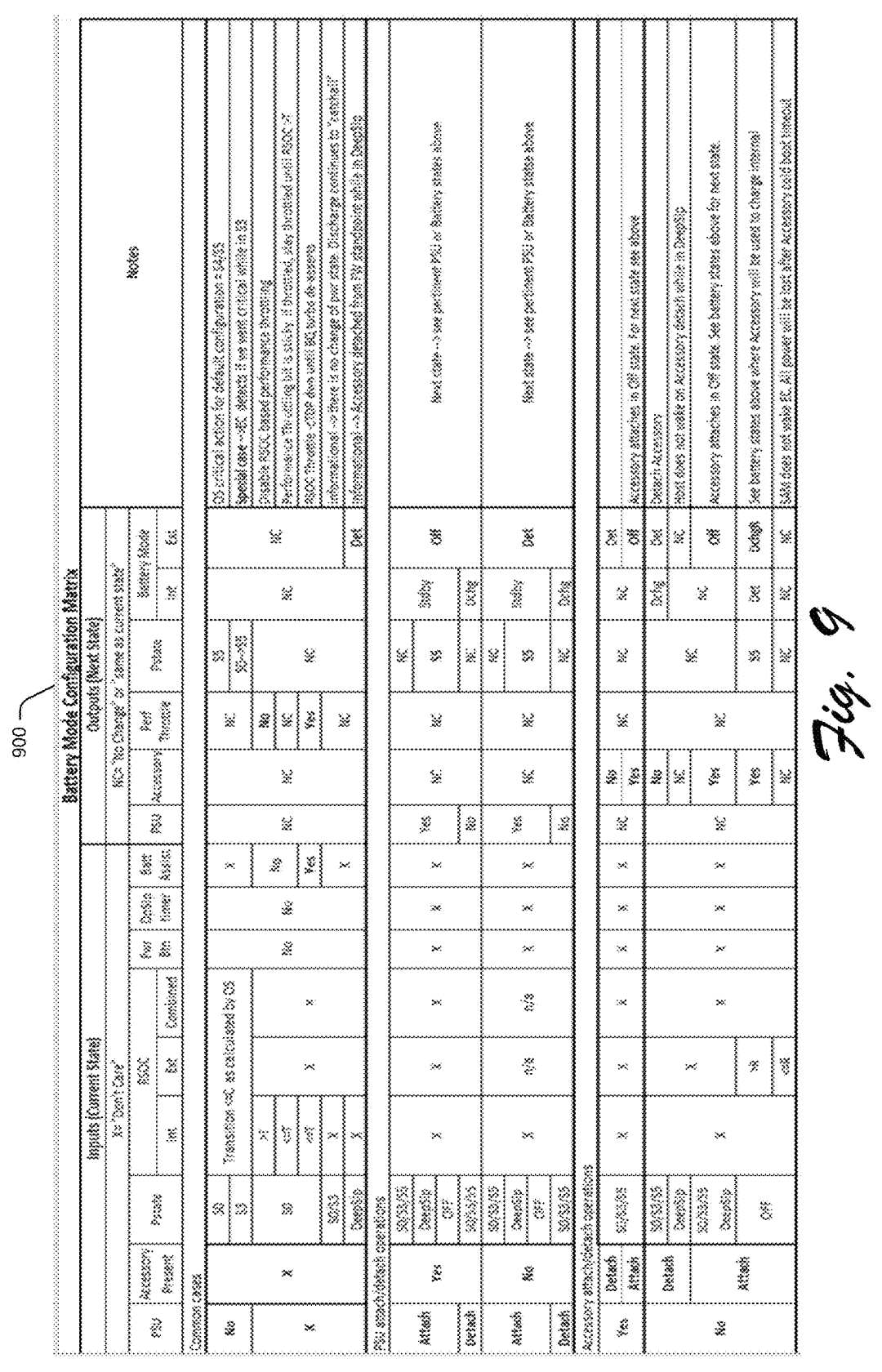

In the context of the foregoing discussion, FIGS. 8, 9, and 10 depict an example implementation of a power management state table. The example power management state table represents but one illustrative example of a suitable data structure that may be employed to define power exchange states and map the states to corresponding actions. A variety of other arrangements of a power management state table for use by a power scheme to manage power for a host computing device are also contemplated.

Together, FIG. 8 and FIG. 9 depict a power management state table for a plurality of power exchange states defined for a system. FIG. 10 depicts a key that describes various symbols, abbreviations, conventions and so forth employed within the power management state table. In particular, FIG. 10 defines different system power states or "Pstates", battery modes (e.g., charge, discharge, standby, off, detach), and RSOC categories employed in the tables, and depicts a formula for combined RSOC used in the charts.

More particularly, FIG. 8 depicts a portion of the power management state table for multiple "PSU attached states" in which a PSU (e.g., power adapter) is connected to the host and multiple "Battery only states" in which the PSU is not connected to the host. FIG. 9 depicts a continuation of the power management state table for state associated with some "Common cases", "PSU attach/detach operations", and "Accessory attach/detach operations." Accordingly, the power management state table shown across FIGS. 8 and 9 may define a range of different power exchange states corresponding to various configurations and operating conditions of the host system that may be encountered at different times.

The "inputs" in the table represent the criteria that define the state and that may be used to recognize and distinguish between states. The "outputs" represent power management control actions that may be applied to change the state to a next state. Each row of the power management state table maps a set of input (e.g., the current power exchange state) to outputs that specify the power management control actions/settings to apply in response to detection of the state. In the example table, the input criteria include connection status for the PSU, connection status for the accessory, a "Pstate" which indicates a system power state, RSOC for an internal battery, RSOC for an external, accessory battery, and the combined RSOC for the batteries. In this example, input criteria may further include indications of whether or not: a power button is on "Pwr Btn", a timer to transition to a sleep mode is active "DpSlp timer, and/or a battery assist mode is active "Batt Assist". The outputs indicate actions or settings to apply when a corresponding state (as defined by the input) is recognized.

Taking the first row in FIG. 8 for example (with reference to the key in FIG. 10), the first row at 802 defines a power exchange state in which the PSU is attached, the accessory is present, and the system is in state S0 (full operating state). Additionally, the RSOC for both internal and external batteries is indicated as "F" or full. The "F" level may be set at some predetermined level above 90% RSOC. The combined state RSOC is not relevant for this case and therefore is indicated as "X." Further, the power button is off and the remaining inputs are also not relevant for this state. Here, both batteries are fully charged and the adapter is attached. In this case, the internal battery may be in standby and the power path to the external battery is off since both batteries are fully charged. When the PSU is detached though, the internal battery may be placed in a charge mode and the external battery may be placed in a discharge mode such as indicated for the row at 804 at the top of the "Battery only states" section of the table. As shown in this portion, the power scheme may be configured to discharge the external battery to maintain the state of the internal battery.

In operation, the power scheme 414 may operate by way of the power controller 112 or otherwise to evaluate the power exchange state at a designated interval. The power scheme 414 may apply power management control action to cause a progression to various different configurations (output states) as the operating conditions, RSOCs, connection status, and other criteria change. The particular configurations, state definitions and corresponding actions may be specified according to a power management state table as just described.

Having considered the foregoing example procedures, consider now a discussion of example systems and devices that may be employed to implement aspects of accessory device authentication techniques in one or more embodiments.

Example System and Device

Figure 11:
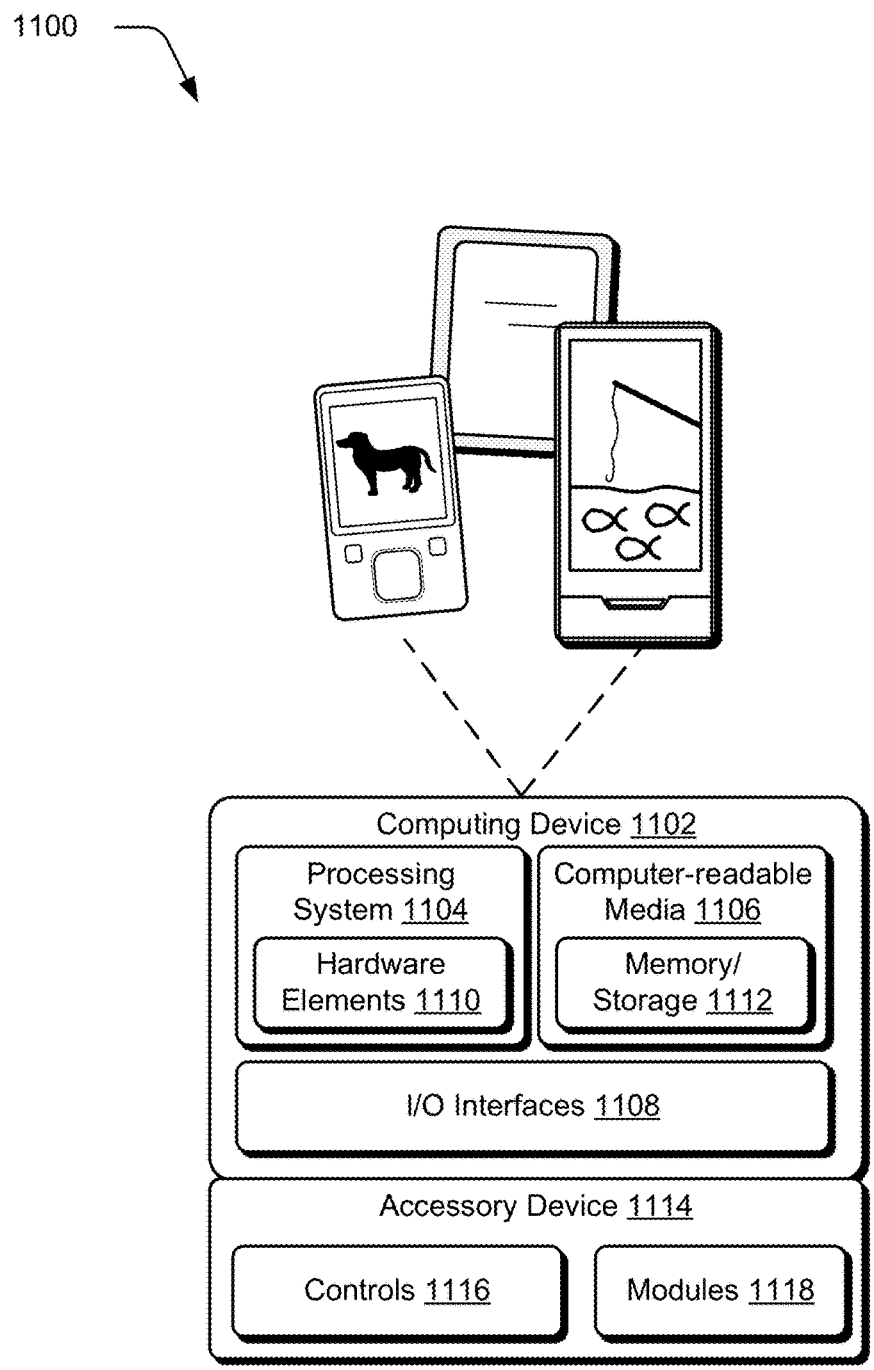
FIG. 11 illustrates an example system including various components of an example device that can be implemented as any type of computing device to implement embodiments of the techniques described herein.

FIG. 11 illustrates an example system generally at 1100 that includes an example computing device 1102 that is representative of one or more computing systems and/or devices that may implement the various techniques described herein. The computing device 1102 may be, for example, be configured to assume a mobile configuration through use of a housing formed and size to be grasped and carried by one or more hands of a user, illustrated examples of which include a mobile phone, mobile game and music device, and tablet computer although other examples are also contemplated.

The example computing device 1102 as illustrated includes a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways to support user interaction.

The computing device 1102 is further illustrated as being communicatively and physically coupled to an accessory device 1114 that is physically and communicatively removable from the computing device 1102. In this way, a variety of different input devices may be coupled to the computing device 1102 having a wide variety of configurations to support a wide variety of functionality. In this example, the accessory device 1114 includes one or more controls 1116, which may be configured as press-sensitive keys, mechanically switched keys, buttons, and so forth.

The accessory device 1114 is further illustrated as include one or more modules 1118 that may be configured to support a variety of functionality. The one or more modules 1118, for instance, may be configured to process analog and/or digital signals received from the controls 1116 to determine whether an input was intended, determine whether an input is indicative of resting pressure, support authentication of the accessory device 1114 for operation with the computing device 1102, and so on.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" refers to media and/or devices that enable storage of information in contrast to mere signal transmission, carrier waves, or signals per se. Thus, computer-readable storage media does not include signals per se or signal-bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, microcontroller devices, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

Conclusion

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A method comprising:
determining a power exchange state defined by a power scheme implemented by a host computing device that includes an internal battery, the power exchange state corresponding to power management control actions that prioritize maintaining the internal battery of the host computing device above a designated threshold level, the power scheme configured to enable a power exchange among the internal battery of the host computing device, an external battery of an accessory device attached to the host computing device, and an external power source; and
controlling the power exchange with the accessory device coupled to power the host computing device based at least in part on the determined power exchange state in accordance with the power scheme, such that:
in a first instance where the accessory device is not connected to the external power source, power from the external battery is utilized to power the host computing device until the external battery is discharged before utilizing power from the internal battery, and
in a second instance where the accessory device is connected to the external power source, recharging the internal battery from the external power source is prioritized over recharging the external battery.

2. The method as recited in claim 1, wherein in the first instance, the power scheme is configured to treat the external battery as discharged when the external battery drops below 10 percent.

3. The method as recited in claim 1, wherein the power scheme is implemented in firmware for a microcontroller of the host computing device.

4. The method as recited in claim 1, wherein the power scheme defines multiple power exchange states based at least in part on relative states of charge of the internal battery of the host computing device and the external battery implemented with the accessory device.

5. The method as recited in claim 4, wherein the multiple power exchange states defined by the power scheme are further based on a connection status of the accessory device to the host computing device, and another connection status of the external power source to the accessory device.

6. The method as recited in claim 4, wherein a power management state table maps the multiple power exchange states to corresponding power management control actions that manage powering at least one of the host computing device and the accessory device.

7. The method as recited in claim 6, wherein controlling the power exchange comprises:
 referencing the power management state table to determine the power management control actions corresponding to the determined power exchange state; and
 applying the power management control actions that correspond to the determined power exchange state.

8. The method as recited in claim 1, wherein in the first instance, controlling the power exchange comprises supplying power from the host computing device to the accessory device to operate the accessory device when the external battery is discharged.

9. The method as recited in claim 1, wherein in the first instance, controlling the power exchange comprises discharging the external battery implemented with the accessory device and charging the internal battery of the host computing device to operate the host computing device.

10. The method as recited in claim 1, wherein in the second instance, controlling the power exchange comprises charging both the internal battery of the host computing device and the external battery of the accessory device from the external power source.

11. The method as recited in claim 1, further comprising authenticating the accessory device for the power exchange with the host computing device, the authenticating including:
 requesting credentials from the accessory device via an accessory interface to which the accessory device is connected to the host computing device;
 obtaining the credentials supplied by the accessory device; and
 verifying the credentials against known credentials for identified accessory devices that are authorized to exchange power with the host computing device.

12. A host computing device comprising:
 a memory configured to store computer instructions as a power controller, and a power management state table that maps multiple power exchange states to corresponding power management control actions that manage powering the host computing device; and
 one or more microcontrollers configured to execute the computer instructions of the power controller implementing operations to:
 determine a power exchange state from the power management state table for the host computing device to enable a power exchange between an internal battery of the host computing device and an accessory device that includes an external battery connected to the host computing device; and
 control the power exchange with the accessory device coupled to power the host computing device based at least in part on the determined power exchange state and the corresponding power management control actions such that when available power from an external power source that is connected to the accessory device is prioritized to first power the host computing device by routing the available power through the accessory device to the host computing device, second charge the internal battery of the host computing device with remaining available power, and third charge the external battery of the accessory device when the internal battery is charged to a threshold level, and when power from the external power source is not available, power the host computing device from the external battery before utilizing the internal battery.

13. The host computing device as recited in claim 12, wherein the multiple power exchange states are based at least in part on relative states of charge of the internal battery of the host computing device and the external battery implemented with the accessory device.

14. The host computing device as recited in claim 12, wherein the multiple power exchange states are defined by a power scheme for the host computing device, the power scheme based at least in part on a connection status of the external power source.

15. The host computing device as recited in claim 12, wherein the corresponding power management control actions are configured to maximize a relative state of charge for the internal battery of the host computing device by using available power from the external battery of the accessory device or from the external power source to charge the internal battery.

16. The host computing device as recited in claim 12, wherein the threshold level is less than 100 percent charged.

17. A system, comprising:
 a host computing device having an internal battery to power the host computing device;
 an accessory device implemented with an external battery, the accessory device connected to the host computing device; and,
 a power controller configured to determine a power exchange state that when an external power source connected to the accessory device is available, the power exchange state powers the host computing device by routing power through the accessory device to the host computing device and charges the host internal battery of the host computing device to a threshold level before charging the external battery of the accessory device and when the external power source is not available, the power exchange state powers the host computing device from the external battery before utilizing the internal battery to power the host computing device.

18. The system as recited in claim 17, wherein the power controller includes a power management state table that maps multiple power exchange states to corresponding power management control actions that manage powering the host computing device, and the power controller is configured to determine the power exchange state from the power management state table.

19. The system as recited in claim 18, wherein the corresponding power management control actions are configured to maximize a relative state of charge for the internal battery of the host computing device by using available power from the accessory device to charge the internal battery.

20. The system as recited in claim 17, wherein the threshold level is fully charged.

\* \* \* \* \*